(12) United States Patent
Jain

(10) Patent No.: US 6,259,677 B1
(45) Date of Patent: Jul. 10, 2001

(54) CLOCK SYNCHRONIZATION AND DYNAMIC JITTER MANAGEMENT FOR VOICE OVER IP AND REAL-TIME DATA

(75) Inventor: Jaswant R. Jain, Chatsworth, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/164,431

(22) Filed: Sep. 30, 1998

(51) Int. Cl.$^7$ .................................................. H04J 3/24
(52) U.S. Cl. .................... 370/252; 370/352; 370/509; 370/516
(58) Field of Search .................... 370/389, 352, 370/356, 400, 401, 503, 507, 508, 509, 516, 517, 518, 519, 252; 375/356, 359, 371

(56) References Cited

U.S. PATENT DOCUMENTS

| | | | |
|---|---|---|---|
| 4,530,091 | * 7/1985 | Crockett | 370/503 |
| 4,894,823 | * 1/1990 | Adelmann et al. | 370/252 |
| 5,255,291 | 10/1993 | Holden et al. | 375/111 |
| 5,790,548 | * 8/1998 | Sugar | 370/352 |
| 6,072,809 | * 6/2000 | Agrawal et al. | 370/503 |
| 6,101,195 | * 8/2000 | Lyons et al. | 370/498 |
| 6,157,653 | * 12/2000 | Kline et al. | 370/412 |

OTHER PUBLICATIONS

*Adaptive Playout Mechanisms for Packetized Audio Applications in Wide–Area Networks* by Ramachandran Ramjee, Jim Kurose, Don Towsley and Henning Schulzrinne, University of Massachusetts/GMD–Fokus, pp. 1–9.

Techniques for Packet Voice Synchronization by Warren Montgomery, Dec. 12, 1983, IEEE, pp. 1–7.

Adaption Algorithms, Playout Algorithms, RTP, Transport Protocols, Service Classes, Mapping Classes and Qos by Isidor Kouvelas, Jan. 27, 1997, GMT, 11 pages.

*Analysis and Control of Audio Packet Loss over Packet–Switched Networks* by Jean Chrysostome Bolot and Hugues Crepin, Sophia–Antipolis Cedex, undated, pp. 1–6.

Characterizing End–to–End Packet Delay and Loss in the Internet by Jean–Chrysostome Bolot, Sophia–Antipolis Cedex, Dec. 1993, Journal of High-Speed Networks, pp. 1–11.

A Distributed Experimental Communications System by John DeTreville and David W. Sincoskie, Dec. 1983, IEEE Journal on Selected Areas in Communications, pp. 1070–1075 (6 pages attached).

* cited by examiner

*Primary Examiner*—Ricky Ngo
(74) *Attorney, Agent, or Firm*—Marger Johnson & McCollom P.C.

(57) ABSTRACT

A real-time receiver and method for receiving and playing out real-time packetized data are disclosed. The receiver includes a packet transmission fixed delay estimator and a packet transmission variable delay estimator. The fixed delay estimator determines, using packets received up to the current point in a conference, the non-variable portion of observed delays. This non-variable portion is subtracted from each packet's observed delay to obtain a variable delay estimate for that packet.

Since variable delays actually drive the buffering time needed at the receiver to achieve smooth playout, the packet variable delay estimates can be used directly to adjust playout delay. Adaptive playout delay is preferably set aggressively low, based on observed packet variable delay estimates, to reduce data latency. Playout delay can be adjusted rapidly upwards when higher packet delays are observed, allowing rapid adaptation to network statistical variations and reducing the frequency of late packets.

18 Claims, 6 Drawing Sheets

CLOCK SYNCHRONIZATION AND DYNAMIC JITTER MANAGEMENT FOR VOICE OVER IP AND REAL-TIME DATA

FIELD OF THE INVENTION

This invention pertains generally to methods and systems for communication of real-time audio, video, and data signals over a packet-switched data network, and more particularly to methods and systems for managing real-time data packet receipt and playout in the presence of variable packet delays.

BACKGROUND OF THE INVENTION

Most data networks are packet-switched. Data is communicated over a packet-switched network in small chunks, or "packets", which require no dedicated circuit. Each packet contains information that allows the data network to route it to the appropriate destination. Packets from many different senders travel sequentially over single connections between routing points, and packets from the same sender may travel different routes as network conditions change. Consequently, consecutive packets from a specific sender to a specific receiver may experience different delays as they travel different routes or experience different competing traffic loads along the network.

Researchers have sought ways to communicate real-time information over packet-switched data networks in order to take advantage of the time-varying nature and information redundancies found in most real-time data. For example, it is now possible to route voice telephone traffic over data networks through a technique commonly referred to as "Voice Over IP", or "VoIP" for short. VoIP can require significantly less average bandwidth than a traditional circuit-switched connection for several reasons. First, by detecting when voice activity is present, VoIP can choose to send little or no data when a speaker on one end of a conversation is silent, whereas a conventional, circuit-switched telephone connection continues to transmit during periods of silence. Second, the digital audio bitstream utilized by VoIP may be significantly compressed before transmission using a codec (compression/decompression) scheme. Using current technology, a telephone conversation that would require two 64 kbps (one each way) channels over a circuit-switched network may utilize a data rate of roughly 8 kbps with VoIP.

The variation in packet arrival rate, or "jitter", existing on most packet networks, presents challenges for real-time communication. To compensate for jitter, a real-time receiver must buffer packets for an amount of time sufficient to allow orderly, regular playout of the packets. Researchers have long recognized the need for an accurate method of receiver playout buffer length selection in real-time packet data communications such as VoIP. If the buffer delay is too short, "slower" packets will not arrive before their designated playout time and playout quality suffers. If the buffer delay is too long, it noticeably disrupts interactive communications. Selection of a near-optimal packet buffer delay for real-time communications requires accurate knowledge of actual packet delays.

Various protocols have been suggested for allowing receivers to obtain delay information. These include two described by W. Montgomery, "Techniques for Packet Voice Synchronization", IEEE J. on Selected Areas in Comm., vol. SAC-1, No. 6, pp. 1022–1028, Dec. 1983. One protocol uses an absolute clock reference by both a sender and a receiver. The sender timestamps each packet, and the receiver compares the timestamps on packets it receives to the absolute clock reference to determine delay. A second protocol would require that each packet switch along the network update a packet delay field to include the amount of time the packet was delayed by the switch. Since switches are the major source of variations in delay, the receiver can estimate delay by examining the delay field in received packets.

Unfortunately, neither of the protocols mentioned above are in widespread use today. Instead, most real-time packet data transmissions utilize the Real-time Transport Protocol (RTP). A sender using this protocol includes a packet timestamp generated from a local clock. The clock rate used to generate consecutive RTP timestamps is the clock rate of the data being transmitted—thus two consecutive packets should carry timestamps that differ by the number of data samples contained in the first of the two packets. Although RTP timestamps allow a receiver to reassemble samples in correct order, they contain no absolute delay information because the sender and receiver local clocks are not synchronized.

Despite the lack of absolute delay information in RTP headers, researchers have found ways to use adaptive, rather than fixed, buffer delays with RTP data streams. Although a fixed playout buffer delay can work in some circumstances (particularly with real-time communication over local area networks), adaptive playout buffer delay methods will generally perform better over a range of network conditions. An adaptive method attempts to minimize delay for current network conditions. Most techniques for adaptively adjusting buffer delay base their adjustments on statistics gleaned from RTP (or similar) timestamp histories. Four such techniques are discussed in R. Ramjee, et al., "Adaptive Playout Mechanisms for Packetized Audio Applications in Wide-Area Networks" in Proceedings of the Conference on Computer Communications (IEEE Infocom), (Toronto, Canada), pp. 680–688, June 1994.

Each technique discussed in Ramjee et al. computes a delay estimate $d_i$ and a delay variation $\hat{v}_i$ for each packet i. The basic adaptive algorithm is illustrated in FIG. 1. A packet i, containing a timestamp $ts_i$ affixed to packet i by the sender, is received from packet-switched network 20 by receiver 16. Summer 24 subtracts timestamp $ts_i$ from a receive timestamp $tr_i$, taken from receiver clock reference 22, to produce a difference sample $n_i$. With RTP, this difference will include an offset equal to the difference between the sender and receiver clock references. First-order filter 26 computes a mean delay estimate $\hat{d}_i$ from difference samples $n_i$. Summer 28 feeds the absolute value of the difference between $\hat{d}_i$ and $n_i$ to a second filter 30, which uses these samples to create a filtered estimate of the variation in delay $\hat{v}_i$. Multiplier 32 produces a multiple k of $\hat{v}_i$, which summer 34 adds to $\hat{d}_i$ and $\hat{t}\hat{s}_i$ to create a playout time $p_i$ for packet i.

Ramjee et al.'s other three discussed methods comprise various heuristic adaptations of the adaptive playout delay estimator of FIG. 1. One adaptation uses different time constants for filter 26, depending on whether the latest measurement $n_i$ will increase or decrease delay estimate $\hat{d}_i$. Another adaptation suspends delay estimate filtering temporarily if it detects a "spike" in the packet arrival rate. A fourth algorithm dispenses with filter 26 altogether, by examining all $n_i$ computed for the last talkspurt received and setting $\hat{d}_i$ to the minimum of these values for the next talkspurt.

SUMMARY OF THE INVENTION

The present invention provides a packet-based real-time communication system utilizing an adaptive jitter management system to reduce buffer latency while avoiding jitter underflow (jitter underflow occurs when the playout buffer runs out of data to playout). This system seeks to overcome several deficiencies in prior art adaptive systems, thereby providing increased performance over a wide variety of network conditions.

Variation in packet delay is not a stationary process. Despite this, most prior art algorithms attempt to estimate packet delay statistics with time-based estimates such as mean arrival time and variance from mean arrival time. Such algorithms tend to under perform at startup, as well as when packet delay statistical transitions occur. Furthermore, a "mean+rule-of-thumb times variance" playout estimate must be keyed to assumptions about the expected distribution of packet delays—because these assumptions will not always hold, the rule-of-thumb must be set conservatively. The prior art has attempted to cope with these deficiencies through a variety of heuristic adaptations, such as the statistical anomaly "spike" detector discussed in Ramjee et al. It is recognized herein that statistical estimation techniques are generally ill-suited for adaptive jitter control over a time-variant network.

The present invention avoids the statistical pitfalls of the prior art by basing playout buffer adjustments on the one stable statistic that exists in a packet-switched conference—fixed transmission delay. Instead of referencing statistical estimates to recent trends in the data, the present invention computes variable packet delays with reference to a minimum delay estimate valid for all received packets. The stability of the minimum delay statistic allows the present invention to accurately follow the jitter envelope of the variable packet delays and adjust playout time accordingly. A further benefit of the system is rapid convergence of the minimum delay statistic, which allows aggressive initial settings and good performance at connection startup.

In one aspect of the present invention, a packet-based real-time data receiver comprises a packet transmission fixed delay estimator and a packet transmission variable delay estimator. The fixed delay estimator keeps track of fixed delay (including offsets) over the duration of a conference connection. When a conference packet is received prior to a minimum arrival time predicted for that packet by the current fixed delay estimate, the fixed delay estimate is adjusted downwards (i.e., a packet with lower than the predicted fixed delay has been received, therefore the fixed delay estimate was too high). The packet transmission variable delay estimator calculates a variable delay for each received packet. A minimum arrival time based on the fixed delay estimate is subtracted from the packet's actual arrival time by the variable delay estimator.

The packet variable delays are preferably used by an adaptive playout delay estimator within the receiver. The adaptive playout delay estimator adapts packet playout delay in an attempt to reduce latency as much as possible without causing jitter underflow. In a preferred embodiment, this estimator performs a non-linear filter operation on the packet variable delays. The receiver may use the packet playout delay to control a playout buffer.

In another aspect of the present invention, a method of receiving and playing packetized real-time data is disclosed. When a real-time conference is established over a packet-switched network, a packet transmission fixed delay estimate and a playout delay estimate are initialized. A packet delay is calculated for each packet as it is received. The fixed delay estimate is adjusted downwards if the fixed delay estimate is greater than the packet delay for the current packet. A packet variable delay estimate is then obtained for the packet by subtracting the fixed delay estimate from the packet delay.

Preferably, the method further comprises non-linear adaptation of a playout delay estimate. In one embodiment, as packet variable delay estimates are calculated, they are filtered into the playout delay estimate using a non-linear gain filter. The gain of the filter is based on the ratio of the packet variable delay estimate to the playout delay estimate.

BRIEF DESCRIPTION OF THE DRAWING

The invention may be best understood by reading the disclosure with reference to the following figures.

DETAILED DESCRIPTION OF THE PREFERRED EMBODIMENTS

The present invention generally applies to systems that receive real-time packet-switched data. Real-time data, as understood in the art, refers to data whose usefulness decays rapidly if delayed by more than a few seconds, such as interactive voice or video conferencing. One type of real-time data receiver that can employ the present invention is a computer connected to a packet network and either running VoIP software on its microprocessor, or having specialized VoIP hardware or firmware. The invention also applies to a data network telephony gateway. When a gateway operates as a receiver, it must buffer voice packets and output a continuous digital or analog stream onto a circuit-switched system. Other applicable systems include PBX equipment, packet network video or multimedia, and other real-time data delivery systems.

Packet Arrival Time Distributions

Figure 2:
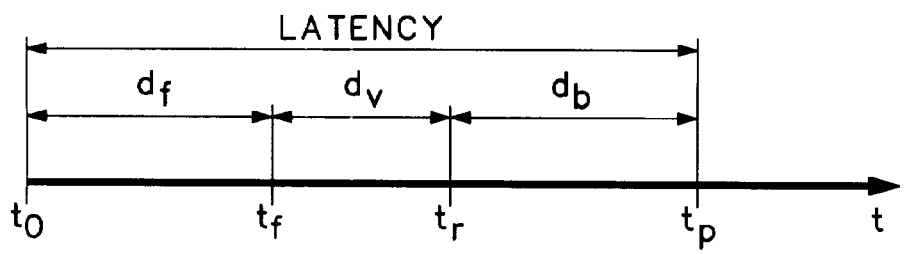
FIG. 2, which shows a breakdown of real-time data latency into its components on a timeline.

For real-time packet-switched data receivers, latency, i.e. the difference between packet send time and packet playout time, is of primary interest. With reference to FIG. 2, playout time $t_p$ for a given packet is related to $t_0$, the time that the packet was constructed by the sender, by a concatenation of three delays. The first delay, $d_f$, represents the minimum travel time that a packet will incur in the network as it passes from sender to receiver. The second delay, $d_v$, represents the variable delay incurred by a packet in the network, e.g., due to competition with other network traffic. A packet is actually received at receive time $t_r = t_0 + d_f = d_v$. The receiver places the packet in a buffer until the designated playout time $t_p$. The difference between playout time $t_p$ and receive time $t_r$ represents the buffer delay $d_b$ set by the receiver for that packet—if $d_b$ is set too low, $t_r$ may exceed $t_p$ for some packets (i.e. late packets) and these packets will miss their playout time. Conversely, if $d_b$ is set too high, packets will wait unnecessarily long for playout.

Figure 3:
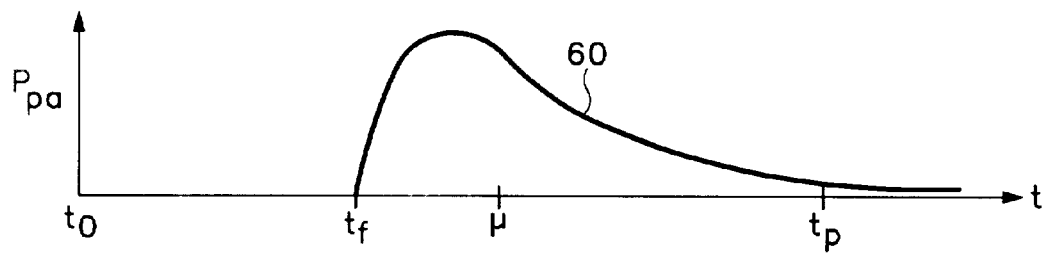
FIGS. 3 and 4, which show probability of packet arrival as a function of packet send time for two network delay distributions.
Figure 4:
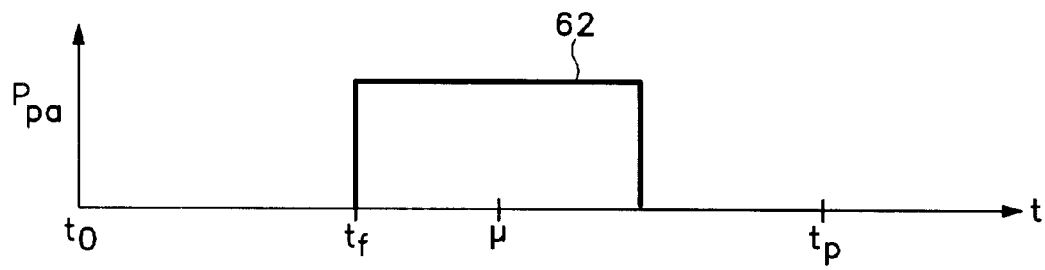

FIGS. 3 and 4 depict two probability distributions for packet arrival time, $p_{pa}$, as a function of $t_0$, over the duration of a conference. FIG. 3 shows $p_{pa}$ as a Rayleigh distribution 60, while FIG. 4 shows $p_{pa}$ as a uniform distribution 62. In both cases, the probability that a packet arrives prior to $t_f=t_0+d_f$ is zero. With a fixed playout time $t_p$, a few packets will arrive too late for playout if packets are distributed as shown by distribution 60. For distribution 62, all packets arrive well ahead of playout time $t_p$.

Most adaptive playout control systems attempt to estimate mean arrival time $\bar{t}_a$ and arrival time variance $\bar{v}_a$ for $p_{pa}$. These systems generally set $t_p=\bar{t}_a+k\bar{v}_a$, where k is a constant. As the system cannot know $p_{pa}$, it must set k conservatively (note that distributions 60 and 62, as shown, have the same mean arrival time). And since $p_{pa}$ is generally non-stationary, mean and variance may be difficult to estimate and track. Finally, variance itself contains some information of little value in setting buffer delay, i.e., information about the variation in packet arrival for packets that arrive before the mean arrival time (note that a minimally-delayed packet increases variance, thus increasing playout delay for such a system).

Fixed Delay and Variable Delay Estimation

The present invention abandons the concepts of mean arrival time and variance. Instead, an adaptive playout control system according to the invention estimates $t_p$, the fixed minimum arrival time for the conference. The fixed minimum arrival time is a stable statistic for all network packet arrival time distributions, both stationary and non-stationary. As will be shown, errors in the initial estimate of minimum arrival time can be corrected with no performance penalty. The preferred embodiments calculate packet jitter for each received packet as the difference between the minimum arrival time and the actual arrival time for that packet. Playout buffer delay is computed from packet jitter values.

Figure 5:
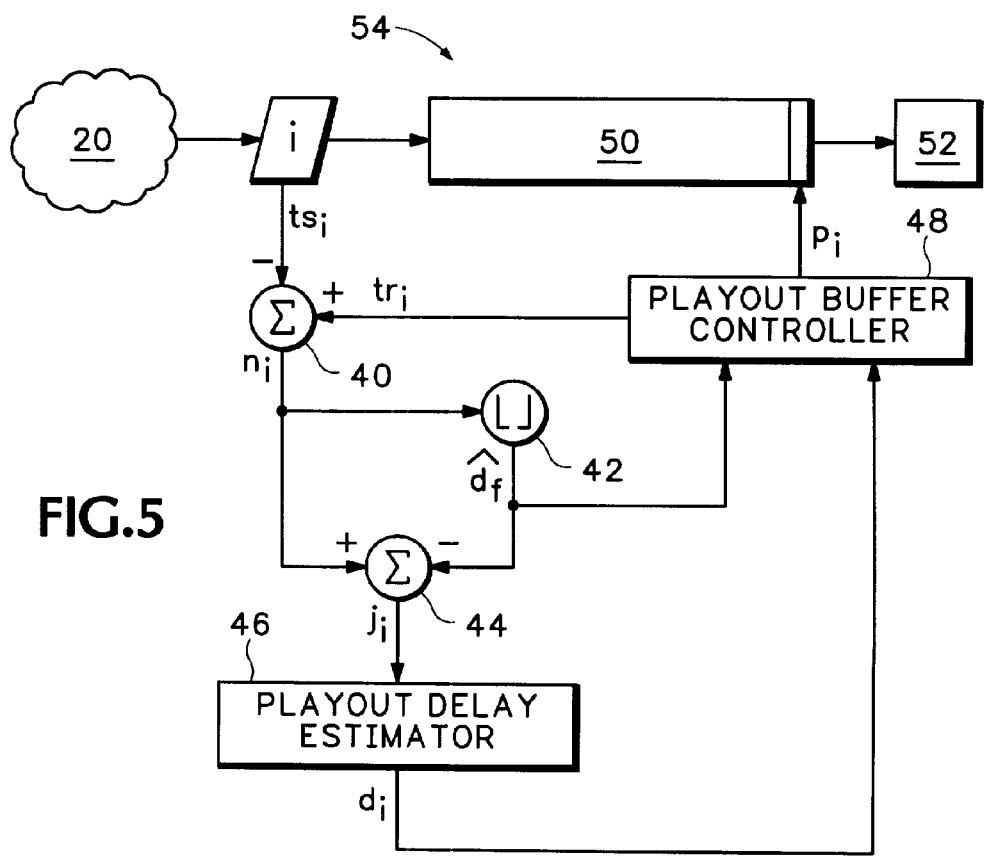
FIG. 5, which illustrates a packet-based real-time data receiver according to one embodiment of the present invention.

FIG. 5 depicts an adaptive packet-based real-time data receiver according 30 to one embodiment of the present invention. Receiver 54 receives packets i from packet data network 20, stores packet data in playout buffer 50, and relays the send timestamp $ts_i$ from packet i to the adaptive circuitry. Playout buffer control 48 computes a playout time $p_i$ for each packet i, and releases packets to playout device 52 at their designated playout time.

Summer 40 computes a raw packet delay $n_i$ for each packet i as the difference between the send timestamp $ts_i$ and a receive timestamp $tr_i$. Generally, timestamps generated by the sending system and the receiving system are not synchronized. The present invention functions whether or not send and receive clocks are synchronized, although the remainder of the discussion assumes a lack of synchronization. Receive timestamp $tr_i$ is computed from a receive clock. The receive clock utilizes a reference clock source related to the real-time data rate; preferably, the timestamp is supplied by playout buffer control 48. Buffer control 48 preferably increments a timestamp counter each time a sample or frame of data is output to playout device 52—this counter is a convenient reference source for $tr_i$.

Fixed delay estimator 42 uses raw packet delays $n_i$ to compute a minimum packet delay estimate $\hat{d}_f$. In its simplest form, fixed delay estimator 42 implements a floor function for all raw packet delays prior to and including raw delay for packet i, i.e., $\hat{d}_f = _{k=0\ to\ i} \lfloor n_k \rfloor$. This delay estimate is not a measure of absolute fixed delay, as it also contains the offset between the unsynchronized send and receive clocks (there is no mechanism to account for such a clock offset separately from a real fixed delay). Delay estimate $\hat{d}_f$ in this embodiment thus represents the minimum clock offset observed over the conference up to packet i.

Variable delay estimator calculates a packet jitter value $j_i$ for each packet i. Packet jitter value $j_i$ equals the estimated absolute variable delay for packet i. Packet jitter, or absolute variable delay, may be calculated by subtracting the clock offset and fixed delay (both contained in $\hat{d}_f$) from raw packet delay $n_i$. Packet jitter values are fed to adaptive playout delay estimator 46, which in turn feeds playout delay values to playout buffer control 48.

Packet-based real-time data receiver 54 may advantageously be implemented as a programmed microprocessor or signal processor. Although machine-level programming is processor-specific, the following pseudocode may be adapted to a specific processor for use in an adaptive playout control system of a real-time data receiver.

```
/* timestamp processing for each packet */
if (first packet)                         /* initialization */
{
    /* set minimum packet delay to delay of first sample */
    fixed_delay = receive_clock - timestamp;
}
/* compute absolute variable delay for packet */
packet_jitter = receive_clock - timestamp - fixed_delay;
/* if packet delay is less than current minimum, adjust minimum */
if (packet_jitter < 0)
{
    fixed_delay = receive_clock - timestamp;
    packet_jitter = 0;
}
```

This code initializes the fixed delay estimate with a first timestamp difference. A packet jitter value is computed for each packet by subtracting the fixed delay from the timestamp difference for that sample. A negative packet jitter value indicates that the packet arrived before the minimum arrival time predicted by the current fixed delay estimate. In such a case, the fixed delay estimate is set to the timestamp difference of the new packet, and that packet's jitter is reset to zero.

Several safety measures may also be implemented in the above pseudocode. For instance, packets received out of sequence or otherwise suspect may be allowed to adjust packet_jitter in only small increments, e.g., one frame. Packets received very late may be marked so that they will not affect playout delay estimates at all. However, a long sequence (e.g., 8 packets) of consecutive very late packets may signify that an error has occurred that requires a reset of the adaptive playout system.

Playout Delay Estimation Using Variable Packet Delays

Jitter values as computed above are constrained to a time-varying envelope of arrival times bounded below by the fixed delay. The upper bound of this envelope must be set high enough to achieve acceptable late packet rates—for instance, for the ITU G.729 voice codec, voice quality degradation becomes noticeable if more than about 1.0% of transmitted voice packets miss their scheduled playout time. At the same time, talkspurts should generally be played out as soon as possible, dictating that the upper bound of the envelope adapt to recent packet jitter values.

A preferred embodiment of the invention includes a playout delay estimator—essentially, such an estimator adjusts an estimate of the upper bound of packet arrival times by comparing the current upper bound to measured packet jitter values. A simple estimator operating on this principle adjusts delay by filtering a constant multiple k of observed jitter values. This delay estimate $d_i$, based on packet i and previous delay estimate $d_{i-1}$, may be expressed as $$d_i = \alpha d_{i-1} + (1-\alpha)kj_i$$

Figure 6:
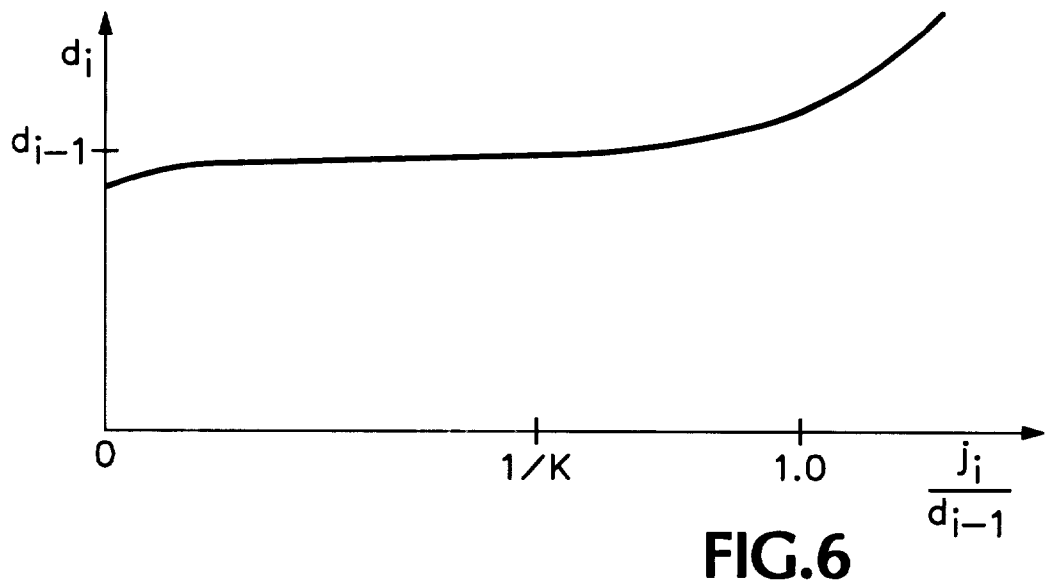
FIGS. 6 and 7, which illustrate two playout delay transfer functions useful with the present invention.

This estimator functions acceptably when used with relatively time-stable packet arrival distributions having a low probability of $j_i > kd_{i-1}$. FIG. 6 illustrates an envelope estimator transfer function, having a nonlinear gain, that is particularly preferred for time-variant packet arrival distributions. No filter adjustment occurs with this filter for packet i if the ratio $$\frac{j_i}{d_{i-1}} = \frac{1}{k}$$

As the ratio of packet jitter to delay estimate varies away from 1/k, the filter gain increases non-linearly, thus allowing the estimator to better track sudden variations in the arrival time upper bound.

In one embodiment, such a nonlinear estimator is approximated by applying different filters at different ranges, or zones, of the ratio of $j_i$ to $d_{i-1}$. The following filter selection approximates nonlinear filtering with k=1.6 and avoids direct ratioing by division, instead comparing $j_i$ to binary-shifted versions of $d_{i-1}$.

$$d_i = \begin{cases} \alpha_1 d_{i-1} + (1-\alpha_1)k j_i & j_i < 0.25 d_{i-1} \\ \alpha_2 d_{i-1} + (1-\alpha_2)k j_i & 0.25 d_{i-1} \le j_i < 0.50 d_{i-1} \\ d_{i-1} & 0.50 d_{i-1} \le j_i < 0.75 d_{i-1} \\ \alpha_3 d_{i-1} & 0.75 d_{i-1} \le j_i < d_{i-1} \\ \alpha_4 d_{i-1} & d_{i-1} \le j_i \end{cases}$$

Figure 7:
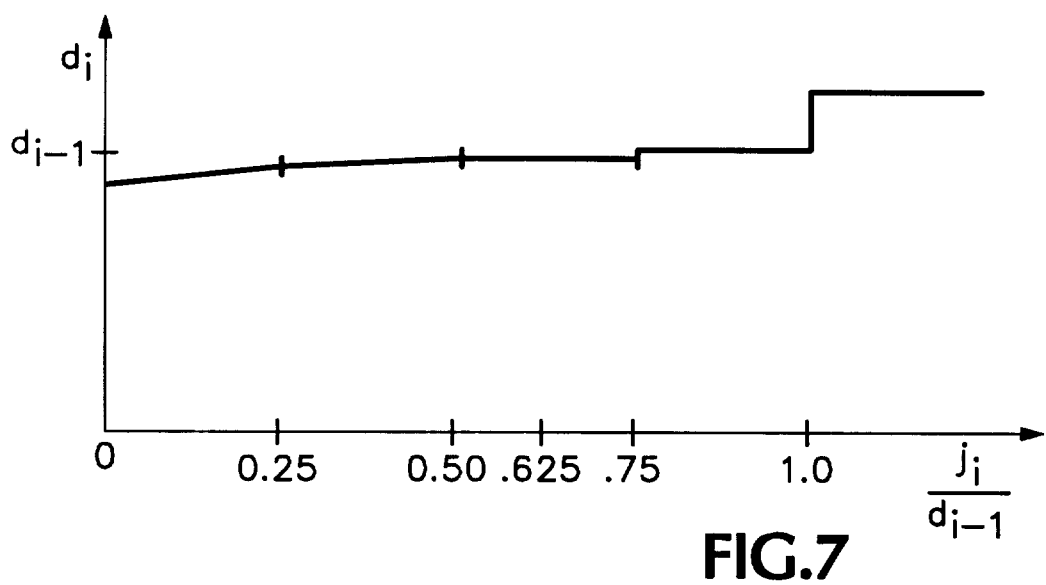

Gain factor settings used in one embodiment of the invention allows binary shifts and adds to be substituted for multiplies and divides; e.g., $\alpha_1=1-2^{-9}, \alpha_2=1-2^{-11}, \alpha_3=1+2^{-6}$, and $\alpha_4=1+2^{-2}$ for 20 msec packet sizes. This transfer function is illustrated in FIG. 7. One characteristic of this setting is a quick envelope response to jitter values that approach or exceed delay estimate $d_i$ (e.g., a 25% increase in $d_i$ for jitter to delay estimate ratios greater than one). In contrast, the envelope responds relatively slowly to small jitter values. This behavior is desirable as it allows large jitter values a heavier weighting in the calculation of delay estimate $d_i$.

Playout Delay Estimation Examples

Figure 8:
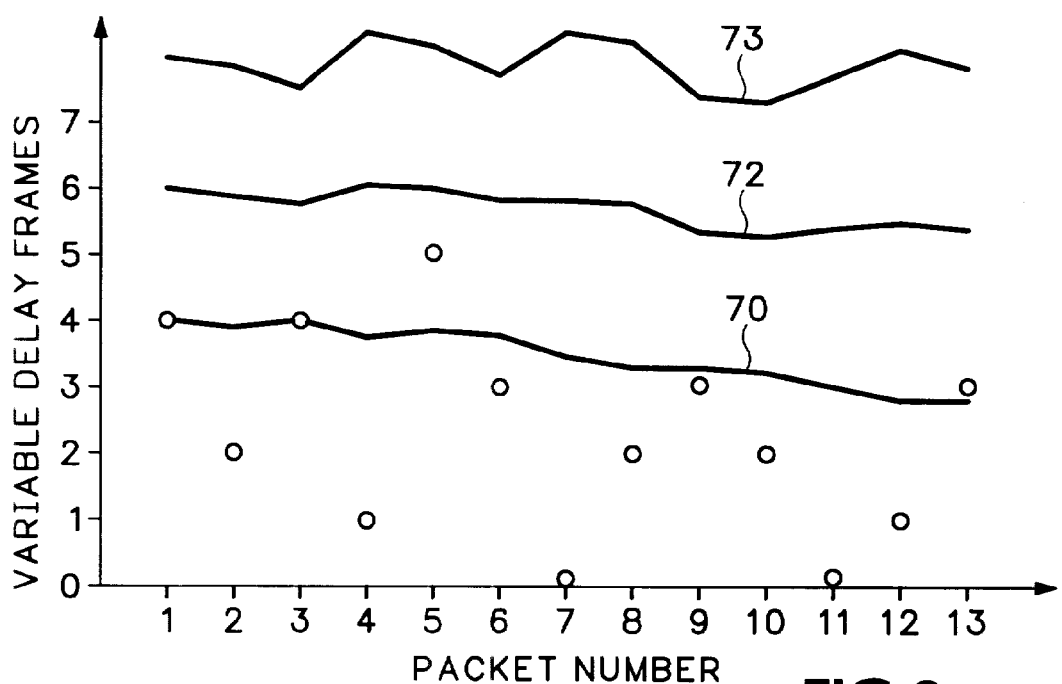
FIGS. 8–11, which compare a prior art adaptive playout delay method to a method according to one embodiment of the invention for two packet arrival sequences.
Figure 9:
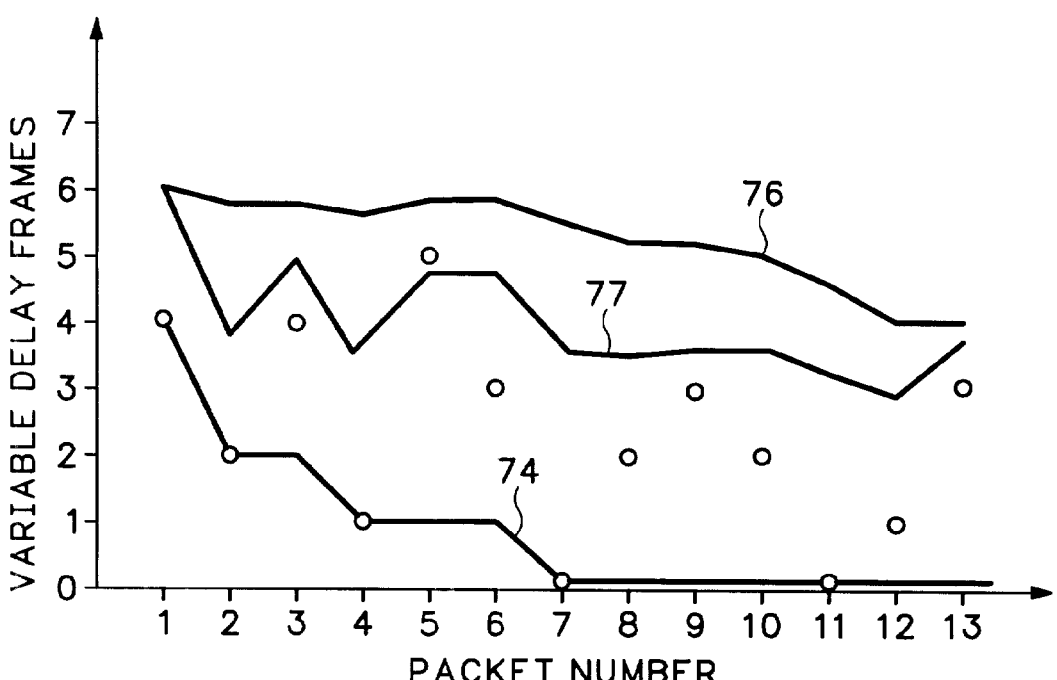

FIGS. 8–11 compare the response of a prior art mean/variance delay estimator to the response of a delay estimator according to the invention, for two sequences of variable packet delay. FIGS. 8 and 9 illustrate a first packet delay sequence (packet delays represented as circles). In these figures, the vertical baseline is the true fixed delay for the sequence.

Figure 1:
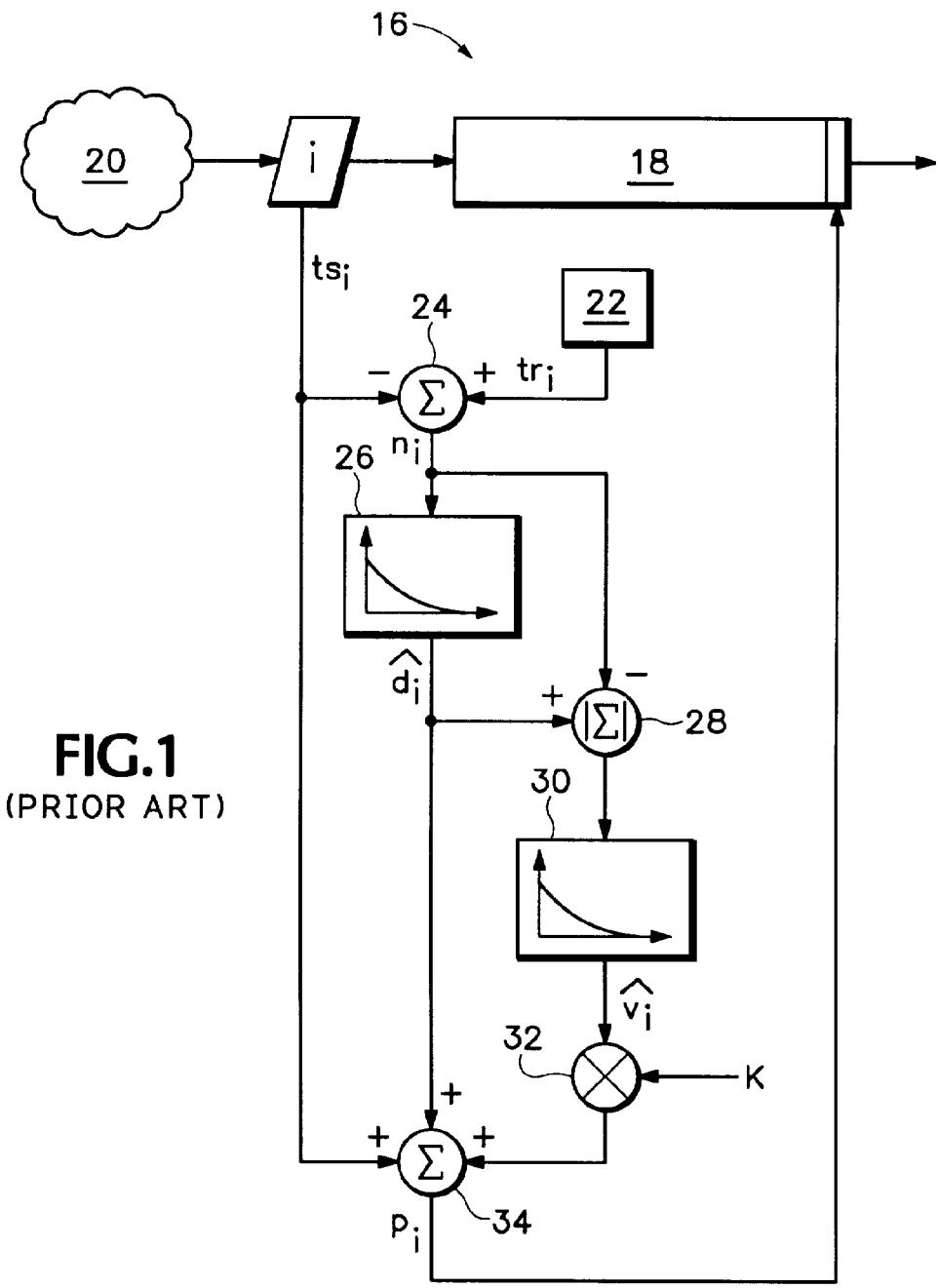
FIG. 1, which shows a block diagram of a prior art adaptive playout delay system.

FIG. 8 illustrates the response of a prior art receiver 16 as in FIG. 1 to the packet delay sequence. Curve 70 plots the mean estimate calculated by receiver 16, and curves 72 and 73 show two playout delay estimates. Curve 72 uses a variance multiplier k=2, while 73 uses k=4 as discussed in Ramjee et al. Packet 1 of the sequence experiences a relatively high variable delay, resulting in a high initial estimate for mean 70. As packet delays decrease towards the end of the sequence, playout delay estimates 72 and 73 remain high. This occurs not only because of the high initial mean estimate, but because the low-delayed packets (i.e. packets 4, 7, 11, 12) actually increase playout delay estimates 72 and 73 because they vary from the mean by a relatively large (although negative) amount. As a result, playout of the latter portion of the sequence may be delayed 2 to 5 frames longer than actually required for the sequence.

FIG. 9 shows the same packet variable delay sequence, along with a fixed delay estimate 74 and two playout delay estimates 76, 77 according to embodiments of the present invention. Like mean estimate 70 above, fixed delay estimate 74 starts off badly in error because of the high delay of packet 1. As each packet with a smaller delay than previously observed packets arrives (i.e. packets 2, 4, 7), fixed delay estimate 74 tracks downward towards the true fixed delay. From packet 7 on, estimate 74 represents the true fixed delay of the connection.

Playout delay 76 follows the 5-region non-linear gain jitter filter methodology set out in FIG. 7 and in the section above for playout delay estimate $d_i$. The embodiment represented by delay 76 uses compensation to avoid direct mirroring of changes in fixed delay estimate 74 in playout delay estimate 76. For instance, at packet two fixed delay estimate adjusts downwards two frames. Delay estimate $d_i$ is adjusted upwards two frames at this point in compensation, such that playout delay 76 does not track fixed delay estimate 74 directly. Playout delay 76 accurately mirrors trends in packet delay over the sequence, while providing a one to two frame cushion.

Curve 77 represents playout delay calculated using a second embodiment of the invention. This embodiment differs from the embodiment producing delay 76 in that it does not compensate $d_i$ for downward shifts in fixed delay 74. Thus at packet 2, playout delay 77 tracks the two-frame adjustment in fixed delay 74, placing it lower than the actual delay of packet 3. This causes the delay estimator to sharply increase $d_i$ at packet 3, although playout delay 77 drops again at packet 4 due to another adjustment in fixed delay 74. Once fixed delay 74 stabilizes, curve 77 should begin to converge with curve 76.

Figure 10:
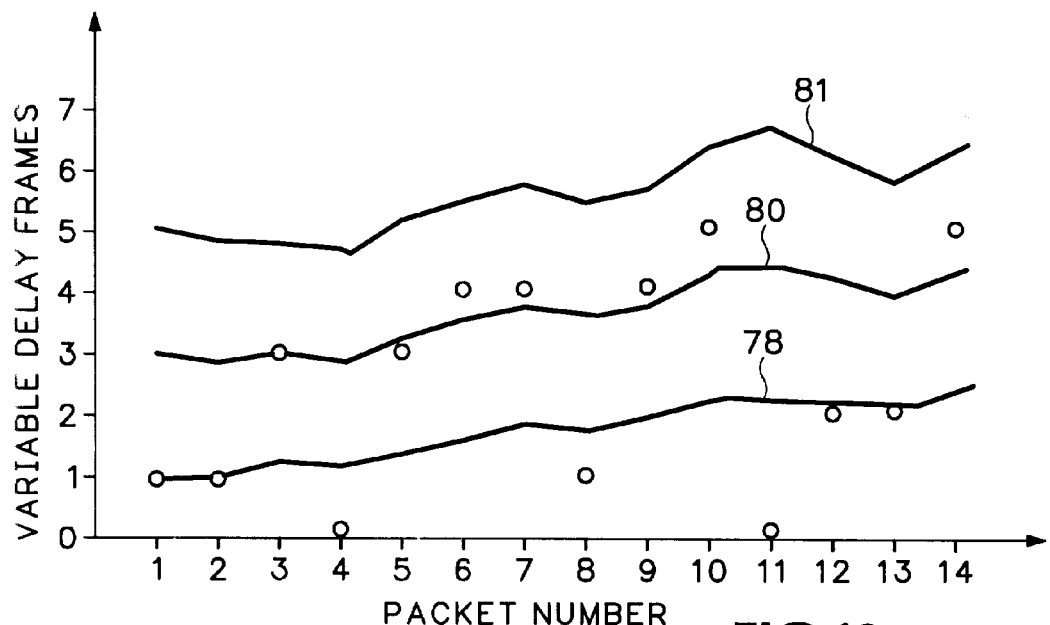
Figure 11:
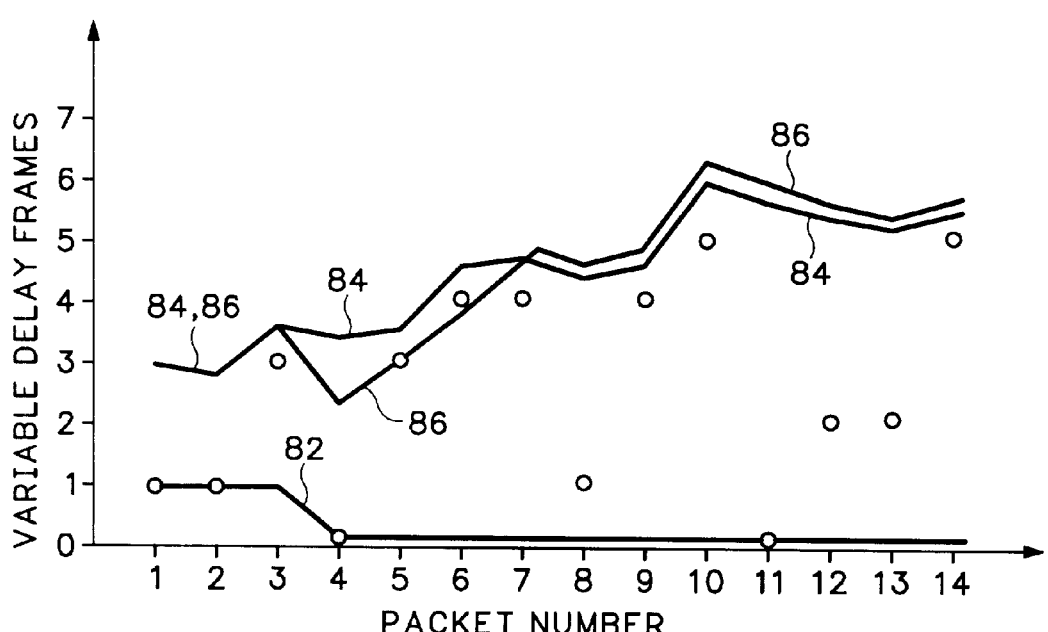

FIGS. 10 and 11 illustrate a second packet arrival sequence. FIG. 10 illustrates performance for prior art adaptive delay estimator 16. Packet 1 experiences a relatively low delay, forcing a low initial mean estimate 78. Other packets with low delay (packets 2, 4, 8, 11, 12, 13) negatively affect growth of playout delay 80 because of their low variance. Consequently, packet 3 arrives at the current playout estimate, and packets 6, 7, 9, 10, and 14 arrive too late for their estimated playout time with k=2 (curve 80). Playout delay estimate 81, with k=4, appears adequate, although this appearance is largely due to the low mean estimate.

FIG. 11 shows the same packet arrival sequence as FIG. 10, this time using fixed delay adjustment-compensating (curve 84) and non-compensating (curve 86) embodiments as described in the description accompanying FIG. 9. Fixed delay estimate 82 adjusts once, at packet 4, where the minimum clock offset observed over the packet sequence occurs. Playout delay estimates 84 and 86 adjust rapidly to envelop the numerous long-delay samples in this sequence. After packet 4, playout delay estimates 84 and 86 begin to converge.

FIGS. 8 through 11 illustrate different startup scenarios that an adaptive playout delay estimator may encounter. But such scenarios also represent statistical shifts in the packet arrival time distribution that may occur mid-conference. The minimum delay estimate of the invention provides a solid reference during these shifts from which playout delay may be adjusted. As a result, the present invention rapidly detects and adjusts to increasing packet delays. Generally, this allows the present invention to maintain a more aggressive playout schedule than prior art systems.

Although receiver 54 preferably adjusts playout delay with every incoming data packet, the estimate preferably does not affect playout from buffer 50 (FIG. 5) at every frame. Playout buffer control 48 utilizes the output of envelope estimator 46 to adjust delay only at the beginning of each talkspurt. Effectively, playout delay is modulated by shrinking or stretching the amount of time between consecutive talkspurts.

Compensating for Statistical Shifts in Fixed Delay

According to the present invention, a real-time packet receiver bases buffer length and playout delay on a fixed delay estimate. Problems may arise if this fixed delay is not truly "fixed" over the duration of a conference. The most common example of this is where the send clock and receive clock operate at slightly different rates, resulting in a constant bias rate in the computed packet timestamp differences. Another example of a shift in fixed delay involves the loss of a network path, forcing all packets to take a longer route. The present invention automatically corrects for negative bias rates and shifts (i.e., faster minimum packet arrivals), and with a slight modification, can correct for positive fixed delay bias rates and shifts also.

Figure 12:
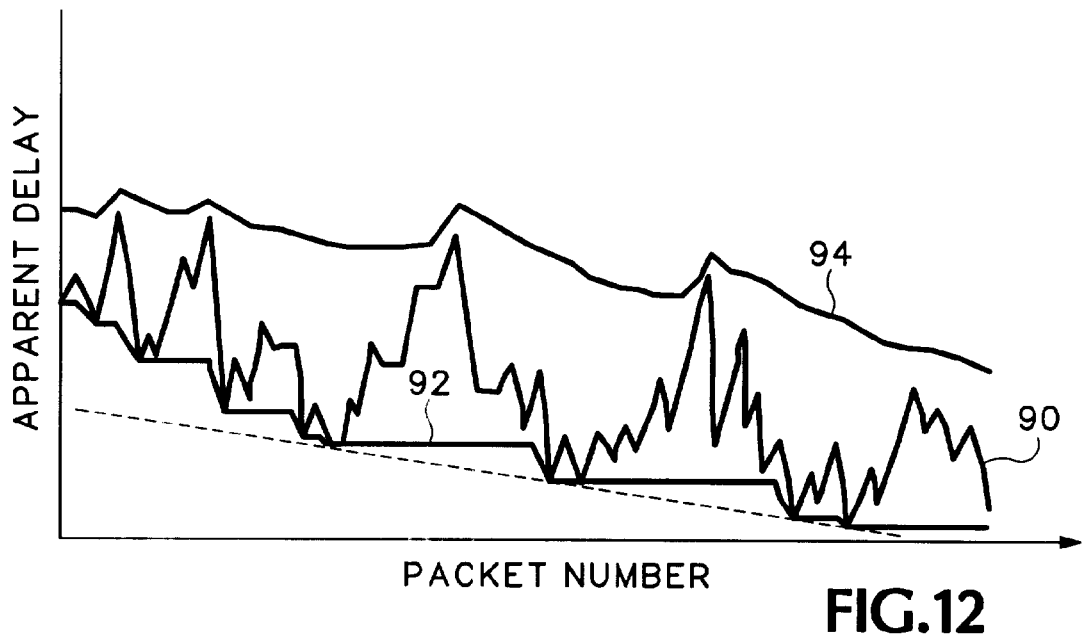
FIGS. 12 and 13, which illustrate performance of embodiments of the invention for skewed send and receive clock rates.

FIG. 12 illustrates a negatively rate-biased packet arrival sequence 90. Fixed delay estimator 42 automatically tracks negative biases, which resemble "better" estimates of minimum delay. Fixed delay estimate 92 stairsteps downward as new samples with smaller clock offsets are received. Playout delay 94 may be configured to stairstep downwards with fixed delay estimate 92. Optionally, and as shown, playout delay 94 does not automatically stairstep downwards with every step of 92, but relies on its envelope-following characteristics to track the negative rate-bias in packet arrival sequence 90.

Figure 13:
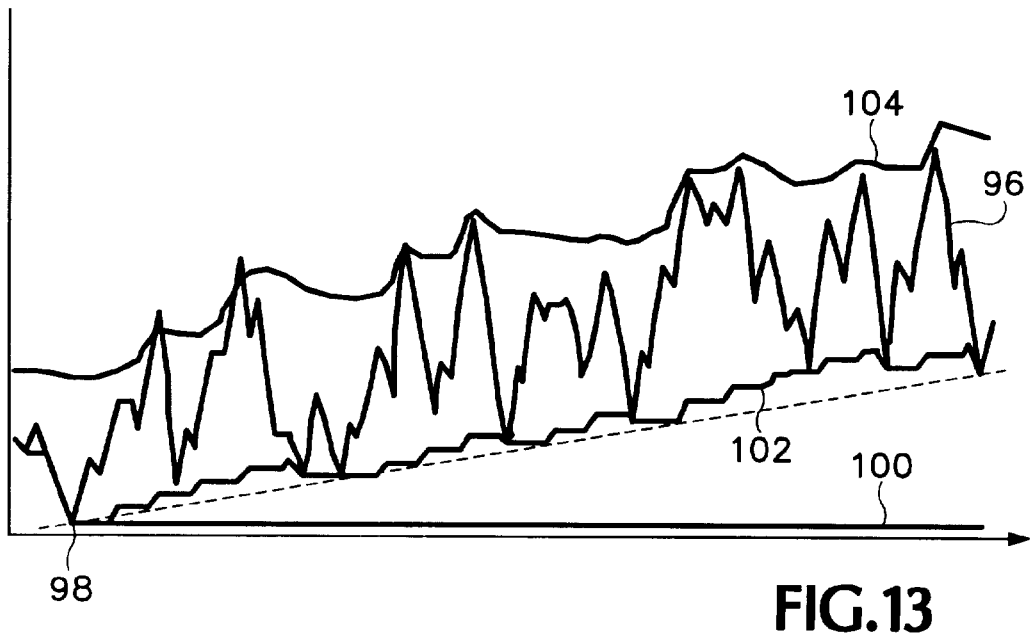

FIG. 13 illustrates a positively rate-biased packet arrival sequence 96. The minimum observed packet arrival occurs at point 98 in sequence 96. Using the basic fixed delay estimator of the present invention, fixed delay would remain at the value observed at point 98, as shown by curve 100, for the remainder of the conference. Over time, a large offset may develop between the true and the estimated fixed delay, resulting in unnecessary playout delay, suboptimal variable delay estimation, and possible eventual playout buffer exhaustion (depending on how the buffer is implemented).

To combat the positive rate-bias problem, it is preferred that a small positive rate bias be introduced artificially into the fixed delay estimate. One method of accomplishing an artificial bias is to count packets since the last downward update to the fixed delay estimate. If the counter reaches a set target value, the fixed delay estimate is increased, e.g., by one frame. If the data has no actual positive rate-bias, a subsequent low-delay packet should quickly re-adjust the fixed delay estimate back down and reset the bias counter. Fixed delay estimate 102 illustrates how the artificial rate bias allows estimator 42 to track a positive rate bias in sequence 96.

In practice, most biases will be unnoticeable over the length of a conference. A low artificial bias rate, e.g., equivalent to one sample/packet, will generally be more than sufficient. If new low-delay packets are not observed after adjustment of the fixed delay upwards, the artificial bias rate may optionally be increased gradually until a new low-delay packet is found. One method of increasing bias rate is to reduce the set target value the counter must reach each time an artificial up-adjustment with no preceding down-adjustment is made.

The invention has been described herein with reference to several illustrative embodiments. Other modifications to the disclosed embodiments will be obvious to those of ordinary skill in the art upon reading this disclosure, and are intended to fall within the scope of the invention as claimed. For example, many possible variations exist for an envelope estimator—the present invention teaches that such an estimator have the capability to decrease playout time in response to observed jitter values much lower than the current playout delay, and relatively rapidly increase playout time in response to observed jitter values of roughly the same magnitude or higher than the current playout delay. Likewise, other methods of implementing positive-rate-bias detection and compensation for fixed delay estimation will be immediately obvious to one of ordinary skill upon reading this disclosure. The particular playout buffer implementation is not critical to the present invention. Numerical values disclosed herein are tuning parameters that may be adjusted for a given application using the principles taught in this disclosure.

What is claimed is:

1. A packet-based real-time data receiver comprising:
   a packet transmission fixed delay estimator, said fixed delay estimator keeping a fixed delay estimate over the duration of a conference connection using said receiver, and adjusting said fixed delay estimate downwards during said conference in response to the arrival of a conference packet prior to a minimum arrival time predicted for that packet by said fixed delay estimate; and
   a packet transmission variable delay estimator, said variable delay estimator calculating a variable packet delay for each conference packet by subtracting a predicted minimum arrival time for each packet, based on said fixed delay estimate, from the actual arrival time of each packet.

2. The data receiver of claim 1, further comprising an adaptive playout delay estimator that adapts packet playout delay for said receiver using variable packet delays from said packet transmission variable delay estimator.

3. The data receiver of claim 2, wherein said adaptive playout delay estimator comprises a non-linear packet variable delay filter.

4. A packet-based real-time data receiver comprising:
   a playout buffer for queuing packets from a received data stream for playout, said packets in said received data stream each containing a packet timestamp generated by a remote system send clock operating at a send clock rate;
   a local timestamp generator operating at approximately said send clock rate;
   a packet transmission fixed delay estimator, said fixed delay estimator comparing the packet timestamp from each received packet to a receive timestamp taken from said local timestamp generator at approximately the arrival time of said received packet, and adjusting a fixed delay estimate downwards in response to the arrival of packets prior to an arrival time predicted by said fixed delay estimate;
   a packet transmission variable delay estimator, said variable delay estimator calculating a variable delay for each packet by subtracting said fixed delay estimate from the difference between the receive timestamp and the packet timestamp; and a playout delay estimator that non-linearly adapts a playout delay estimate for received packets based on the relative magnitude of the playout delay estimate as compared to a variable delay calculated by said packet transmission variable delay estimator.

5. The data receiver of claim 4, wherein said local timestamp generator is synchronized with said remote system send clock.

6. The data receiver of claim 4, wherein said packet transmission fixed delay estimator, packet transmission variable delay estimator, and playout delay estimator comprise a programmed microprocessor.

7. A method of receiving and playing packetized real-time data, said method comprising the steps of:

establishing a real-time conference over a packet-switched network;

for a first real-time data packet received during said conference, initializing a packet transmission fixed delay estimate and a playout delay estimate for the conference; and for each additional real-time data packet received during said conference, calculating a packet delay estimate, adjusting said fixed delay estimate downwards if said fixed delay estimate is greater than said packet delay estimate, and subtracting said fixed delay estimate from said packet delay estimate, thereby obtaining a packet variable delay estimate.

8. The method of claim 7, wherein said step of initializing a packet transmission fixed delay estimate consists of setting said fixed delay estimate to equal the clock offset between a local clock reference and a timestamp affixed to said first data packet by its sender.

9. The method of claim 7, wherein said adjusting said fixed delay estimate downwards step comprises, for a data packet triggering such adjustment, resetting said fixed delay estimate to equal the clock offset between a local clock reference and a timestamp affixed to that data packet by its sender.

10. The method of claim 7, further comprising as a part of said adjusting said fixed delay estimate downwards step, adjusting said playout delay estimate upwards by an equivalent amount.

11. The method of claim 7, further comprising the step of introducing an artificial positive rate bias in said fixed delay estimate.

12. The method of claim 7, further comprising the step of adapting said playout delay estimate throughout the duration of said conference to approximately maintain a preset ratio between said playout delay estimate and said packet variable delay estimates calculated for said real-time data packets.

13. The method of claim 12, wherein said adapting said playout delay estimate comprises applying a correction formula to said playout delay estimate for each packet variable delay estimate, with a correction formula gain determined by the ratio of that packet variable delay estimate to the playout delay estimate.

14. The method of claim 13, wherein said gain is highest for packet variable delay estimates greater than the playout delay estimate and less than a preset maximum variable delay.

15. The method of claim 13, comprising applying said correction formula by mapping said ratio into one of a plurality of ratio zones, each of said zones having a zone-specific gain formula.

16. The method of claim 7, further comprising the step of fixing the playout time for data spurts during said conference using said playout delay estimate.

17. The method of claim 7, wherein said step of adjusting said fixed delay estimate downwards comprises resetting said fixed delay estimate to said packet delay estimate.

18. A method of receiving and playing packetized real-time data, said method comprising the steps of:

establishing a real-time conference over a packet-switched network;

for a first real-time data packet received during said conference, initializing a packet transmission fixed delay estimate and a playout delay estimate for the conference;

introducing an artificial positive rate bias in said fixed delay estimate;

for each additional real-time data packet received during said conference, calculating a packet delay estimate, adjusting said fixed delay estimate downwards if said fixed delay estimate is greater than said packet delay estimate, and subtracting said fixed delay estimate from said packet delay estimate, thereby obtaining a packet variable delay estimate;

adapting said playout delay estimate throughout the duration of said conference to approximately maintain a preset ratio between said playout delay estimate and said packet variable delay estimates calculated for said additional data packets; and periodically adjusting playout time for data packets received during said conference to include a buffer time, measured with reference to the fixed delay estimate, corresponding to said playout delay estimate.

* * * * *

UNITED STATES PATENT AND TRADEMARK OFFICE
CERTIFICATE OF CORRECTION

PATENT NO. : 6,259,677 B1
DATED : July 10, 2001
INVENTOR(S) : Jain

It is certified that error appears in the above-identified patent and that said Letters Patent is hereby corrected as shown below:

Column 2,
Line 51, "$\hat{t}\hat{s}_i$" should read -- $ts_i$ --

Column 4,
Line 63, "$t_r = t_o + d_f = d_v$" should read -- $t_r = t_o + d_f + d_v$ --

Column 5,
Line 41, "receiver according 30 to" should read -- receiver 54 according to --
Line 63, " $d\hat{d}_f$ " should read -- $\hat{d}_f$ --

Column 6,
Line 6, "estimator calculates" should read -- estimator 44 calculates --

Signed and Sealed this

Seventh Day of May, 2002

Attest:

Attesting Officer

JAMES E. ROGAN
*Director of the United States Patent and Trademark Office*